(12) United States Patent
Duez et al.

(10) Patent No.: US 10,322,629 B2
(45) Date of Patent: Jun. 18, 2019

(54) TANK WITH INTERNAL CONNECTING MEMBER AND METHOD FOR ASSEMBLING SUCH A TANK

(71) Applicant: PLASTIC OMNIUM ADVANCED INNOVATION AND RESEARCH, Brussels (BE)

(72) Inventors: Laurent Duez, Uccle (BE); Eric Boucaux, Elincourt Sainte Marguerite (FR); Jules-Joseph Van Schaftingen, Wavre (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 485 days.

(21) Appl. No.: 15/026,360

(22) PCT Filed: Oct. 1, 2014

(86) PCT No.: PCT/EP2014/071102
§ 371 (c)(1),
(2) Date: Mar. 31, 2016

(87) PCT Pub. No.: WO2015/049322
PCT Pub. Date: Apr. 9, 2015

(65) Prior Publication Data
US 2016/0243928 A1    Aug. 25, 2016

(30) Foreign Application Priority Data
Oct. 3, 2013  (EP) ..................................... 13187239

(51) Int. Cl.
*B60K 15/03* (2006.01)
*B60K 15/035* (2006.01)
*F01N 3/28* (2006.01)

(52) U.S. Cl.
CPC ...... *B60K 15/03006* (2013.01); *B60K 15/035* (2013.01); *B60K 15/03177* (2013.01);
(Continued)

(58) Field of Classification Search
CPC ........... B60K 2015/03493; B60K 2015/03032; B60K 15/03; B60K 15/035; B60K 15/03006; B60K 15/03177
(Continued)

(56) References Cited

U.S. PATENT DOCUMENTS

| | | |
|---|---|---|
| 5,103,865 A | 4/1992 | Hyde |
| 5,129,544 A | 7/1992 | Jacobson et al. |

(Continued)

FOREIGN PATENT DOCUMENTS

| | | |
|---|---|---|
| CN | 101489759 A | 7/2009 |
| CN | 102837596 A | 12/2012 |

(Continued)

OTHER PUBLICATIONS

Office Action dated Sep. 10, 2018 in Japanese Patent Application No. 2016-520062, 6 pages. (with English language translation).
(Continued)

*Primary Examiner* — King M Chu
(74) *Attorney, Agent, or Firm* — Oblon, McClelland, Maier & Neustadt, L.L.P.

(57) ABSTRACT

A method for assembling a tank including: providing a first shell and a second shell; putting edges of the first and second shells into contact with each other and mutually connecting the edges; providing the first shell with a first connecting member extending inwardly from an inner surface of the first shell, the first connecting member including a hole; and after the edges of the first and second shells are put into contact with each other, connecting the first connecting member to the second shell by inserting a pin shaped
(Continued)

element through a hole in the second shell and the hole in the first connecting member.

19 Claims, 4 Drawing Sheets

(52) U.S. Cl.
    CPC ............... *B60K 2015/03032* (2013.01); *B60K 2015/03493* (2013.01); *F01N 3/2896* (2013.01); *F01N 2610/02* (2013.01)

(58) Field of Classification Search
    USPC ........................................................ 220/562
    See application file for complete search history.

(56) References Cited

U.S. PATENT DOCUMENTS

| | | | |
|---|---|---|---|
| 5,326,514 | A | 7/1994 | Linden et al. |
| 6,857,534 | B1 | 2/2005 | Keller |
| 2012/0024868 | A1* | 2/2012 | Menke .................. B60K 15/03 220/653 |
| 2012/0138606 | A1* | 6/2012 | Varga ............... B60K 15/03177 220/4.21 |
| 2013/0008908 | A1 | 1/2013 | Hill et al. |
| 2013/0233733 | A1 | 9/2013 | Yamamoto et al. |
| 2014/0014663 | A1 | 1/2014 | Eulitz et al. |
| 2016/0193913 | A1 | 7/2016 | Kataoka et al. |

FOREIGN PATENT DOCUMENTS

| | | |
|---|---|---|
| DE | 827 164 C | 1/1952 |
| DE | 199 09 041 A1 | 9/2000 |
| DE | 10 2009 036911 A1 | 2/2011 |
| DE | 10 2011 015049 A1 | 9/2012 |
| FR | 2 481 773 A1 | 11/1981 |
| JP | 51-57428 U | 5/1976 |
| JP | 2000-515079 A | 11/2000 |
| JP | 2002-538038 A | 11/2002 |
| JP | 2004-90698 A | 3/2004 |
| JP | 2012-35914 A | 2/2012 |
| JP | 2015-83448 A | 4/2015 |
| WO | WO 2012/066647 A1 | 5/2012 |

OTHER PUBLICATIONS

International Search Report dated Oct. 27, 2014, in PCT/EP2014/071102 Filed Oct. 1, 2014.

European Office Action dated dated Apr. 5, 2017 in Patent Application No. 14 777 653.8.

* cited by examiner

TANK WITH INTERNAL CONNECTING MEMBER AND METHOD FOR ASSEMBLING SUCH A TANK

FIELD OF THE INVENTION

The invention relates to a method for assembling a tank, in particular a fuel or an additive tank for a vehicle, comprising providing a first shell and a second shell, and putting the edges of said two shells into contact with each other and mutually connecting said edges such that said shells together form a substantially closed container delimiting an internal volume. The invention also relates to a tank.

BACKGROUND

Fuel tanks assembled from a two plastic shells are known, and may comprise a stabilizing column or wall in the internal volume of the tank in order to limit deformations of the tank. Traditionally fuel systems in passenger vehicles are designed to hold a specific amount of liquid fuel at a pressure essentially the same as the ambient pressure. With the introduction of Hybrid vehicles and more specifically Plug in Hybrids, which are designed such that they could potentially go several months without using fuel, it is in the interest of the system designers to hold pressure inside the fuel tank to limit the emissions that could potentially bleed through the activated carbon canister due to diurnal cycles. In addition, holding pressure ensures that the composition of the fuel stays the same during storage. However, the tanks must be made resistant to this internal pressure. Therefore tank reinforcement can be realized by linking two opposite tank surfaces with each other using an internal connecting member.

It is known to form a stabilizing connecting member in the form of a pillar or wall using a first pillar or wall part that is integrally moulded with the first plastic shell and a second pillar or wall part that is integrally moulded with the second plastic shell. When welding the first shell along its perimeter to the second shell, at the same time, the first pillar or wall part may be connected (e.g. by welding or by a snap connection, see DE 102009036911) to the second pillar or wall part in order to form the stabilizing pillar or wall in the internal volume of the tank. In the case of welding this is a complex and delicate operation as the first and second pillar or wall parts are not easily accessible. The reinforcement pillars or walls are typically at a distance from the perimeter welding path of the first and second shells, resulting in the need for complex welding tools.

SUMMARY

The object of embodiments of the invention is to provide a method for assembling a tank which is more robust and requires a less complicated assembly operation compared to the prior art solutions. Another object of the invention is to provide a tank that may be assembled using a reliable and simple assembly method.

To that end embodiments of the invention provide a method for assembling a tank. The method comprises providing said first shell with a first connecting member extending inwardly from an inner surface of said first shell, said first connecting member being provided with a hole; and after the edges of said first and second shell are put into contact with each other, connecting said first connecting member to the second shell by inserting a locking element through a hole in the second shell and the hole in the first connecting member, such that relative mutual movement between the first connecting member and the second shell is prevented.

In an advantageous embodiment, the locking element is a pin shaped element.

Inserting of the pin shaped element can be done after or before welding of the two tank shells, independently of the welding. The use of such a pin shaped element provides a reliable fixation means for fixing the connecting member in the tank, and limiting the deformation of the tank.

In embodiments of the invention, depending upon the location and shape of the pin shaped element (which may for instance be a hollow tube), there is the possibility to integrate additional functions in the pin shaped element, such as filler spud, a portion of the venting system (attached valves or valves integrated into the connecting member), the possibility to use the pin shaped element as a fuel line or as a venting line, or the possibility to use the transverse pin as a duct for electrical cables.

In one embodiment the pin shaped element directly connects the second shell with the connecting member of the first shell. In a preferred embodiment, however, said second shell is provided with a second connecting member extending inwardly from the inner surface of said second shell and which is provided with a hole, wherein the holes in said first and second connecting members and the hole in said second shell are mutually aligned when the edges of said shells are put into contact with each other. The pin shaped element is inserted through the aligned holes, such that relative mutual movement between the connecting elements and their respective opposite shells is prevented. Thereby the first shell and the second shell are connected by the two connecting members, and the pin functions as a locking element locking the first connecting member with respect to the second connecting member.

Preferably the first and second connecting member each comprise a tubular end part which is provided with two oppositely extending holes, wherein one tubular end part thereof has a larger cross section than the other tubular end part, such that the latter tubular part extends within the first tubular part.

In another embodiment the connecting member can have a substantially cylindrical cross section, or a square cross section, or a rectangular cross section, or a triangular cross section, or a combination thereof.

Preferably the hole(s) in the first connecting member and/or in the second connecting member are such that they create a passage which extends transversely through the elongated first/second connecting member. If the connecting member is a hollow member, typically there will be provided two opposite holes. If the connecting member is a full member, typically there will be provided a single through-hole. However, it is also possible that the pin shaped element does not extend all the way through the connecting member, and that it merely extends in an opening in the connecting member. Typically, the pin shaped element is oriented substantially perpendicular on the connecting member. However, it is also possible that the pin shaped element is oriented under a different angle with respect to the connecting member.

In another preferred embodiment the first shell is provided with a plurality of first connecting members, each first connecting member being provided with a hole. The holes of the plurality of first connecting members and the hole in the second shell are mutually aligned when the edges of the first and second shell are put into contact with each other, and the pin shaped element is inserted through the aligned holes of each first connecting member. By using a plurality of connecting members the strength of the obtained tank may be further improved and/or more functions may be built in the pin shaped connecting element and/or in the first connecting members.

In other embodiments a plurality of first connectors is combined with a plurality of second connectors. There may be provided a single pin shaped element for a plurality of first and second connectors, or there may be provided multiple pin shaped elements which are inserted through different holes of the second and/or first shell.

Preferably, the pin shaped element is inserted transversely through said first connecting member. The pin shaped element may be locally reinforced at the location where it extends through the hole(s) in the first connecting member(s) and/or second connecting member(s). Preferably, the pin shaped element is provided with a laterally extending flange with a surface which is sealed against an outer circumferential surface around the hole in the second shell, such that the hole is sealed.

The edges of the shells are preferably formed by flanges. Typically the shells are made of plastic, and typically the edges of the shells are welded to each other. Preferably the shell and any corresponding connecting member(s) are moulded integrally as a single piece.

The invention also relates to a tank, in particular a fuel tank or an additive tank for a vehicle. The tank comprises a first shell and a second shell. The edges of the first and second shell are mutually connected such that the first and second shell together form a container delimiting an internal volume. The first shell is provided with a first connecting member extending inwardly from an inner surface of said the shell, said first connecting member being provided with a hole. The first connecting member is connected to the second shell by a pin shaped element which extends through a hole in the second shell and the hole in the first connecting member, such that relative mutual movement between the connecting member and the second shell is prevented.

Preferably the second shell is provided with a second connecting member extending inwardly from an inner surface of said second shell. The second connecting member is provided with a hole. The holes in the first and second connecting member and the hole in the second shell are mutually aligned, and the said pin shaped element extends through said aligned holes, such that relative mutual movement between the first and second connecting members and their respective opposite shells is prevented.

In a possible embodiment the first and second connecting member comprises a first and second tubular end part each provided with two oppositely extending holes, respectively. One tubular end part thereof has a larger cross section than the other tubular end part, and a length of the first and second connecting member is such that the other tubular part extends within the one tubular part.

In a possible embodiment the first shell is provided with a plurality of first connecting members, each first connecting member being provided with a hole. The holes of the plurality of first connecting members and the hole in the second shell are mutually aligned, and the pin shaped element extends through the aligned holes of each first connecting member.

Preferably, the pin shaped element extends transversely through the first connecting member and/or the second connecting member. Preferably, the pin shaped element is locally reinforced at the location where it extends through the hole(s) in the first connecting member(s). Preferably, the pin shaped element is provided with a laterally extending flange with a surface which is sealed against an outer circumferential surface around said hole in the second shell, such that said hole is sealed.

Preferably the first shell and the first connecting member(s) are moulded integrally as a single piece.

In a possible embodiment the pin shaped element is a hollow tube, and any one of the following elements is integrated in the pin shaped element: a filler spud, a portion of a venting system. Also the pin shaped element may be adapted to function as any one of the following elements: a fuel line, a venting line, a cable duct.

In a preferred embodiment the first shell is a top shell of the tank and the second shell is a bottom shell of the tank.

According to yet another aspect, the invention relates to a tank assembled according to any one of the above disclosed assembly methods.

Embodiments of the invention are particularly useful for gasoline fuel tanks because of the high pressure that may reign in such tanks. However, embodiments of the invention may also be used in other fuel tanks, in additive tanks, in particular tanks for diesel additives, such as urea tanks, etc. Also in applications where depressurization may occur, tanks according to embodiments of the invention will be useful.

The term "fuel tank" is understood to mean an impermeable tank that can store fuel under diverse and varied environmental and usage conditions. The fuel tank according to the invention is preferably made of plastic, that is to say made of a material comprising at least one synthetic resin polymer. In a preferred embodiment the shells are made of polyamide, e.g. polyamide-6. The shells can be made of a one-layer or multilayer polyamide structure. In another embodiment, the shells can be made of multilayer polyamide-polyethylene (PE) structure. However, all types of plastic may be suitable. Particularly suitable are plastics that belong to the category of thermoplastics. The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are: random copolymers, linear block copolymers, other block copolymers and graft copolymers. One polymer often employed is polyamide. However, excellent results may also be obtained with high-density polyethylene (HDPE). In a particular embodiment, the tank also comprises a layer of a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to fuel. A multilayer fuel tank comprising an EVOH layer between two HDPE layers is successfully used in the frame of the invention.

In preferred embodiments the connecting member connects two opposite wall portions of the tank, i.e. wall portions facing each other, namely a first wall portion being part of the first shell and a second wall portion being part of the second shell. Preferably, these are a lower wall portion (the one mounted facing downwards in the vehicle and which is likely to creep under the weight of the fuel) and an upper wall portion (the one mounted facing upwards and subject to little or no creep during use).

This connecting member and the pin shaped element are by definition rigid, i.e. over the life of the tank, they do not deform by more than a few mm, ideally they deform by less than 1 mm. By "deformation" in meant in fact, a change of the length thereof in the sense that it would space away or approach the two tank shells.

Although certain features have been described only in connection with embodiments of the method, the skilled person understands that corresponding features may be present in the tank, and vice versa.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1A:
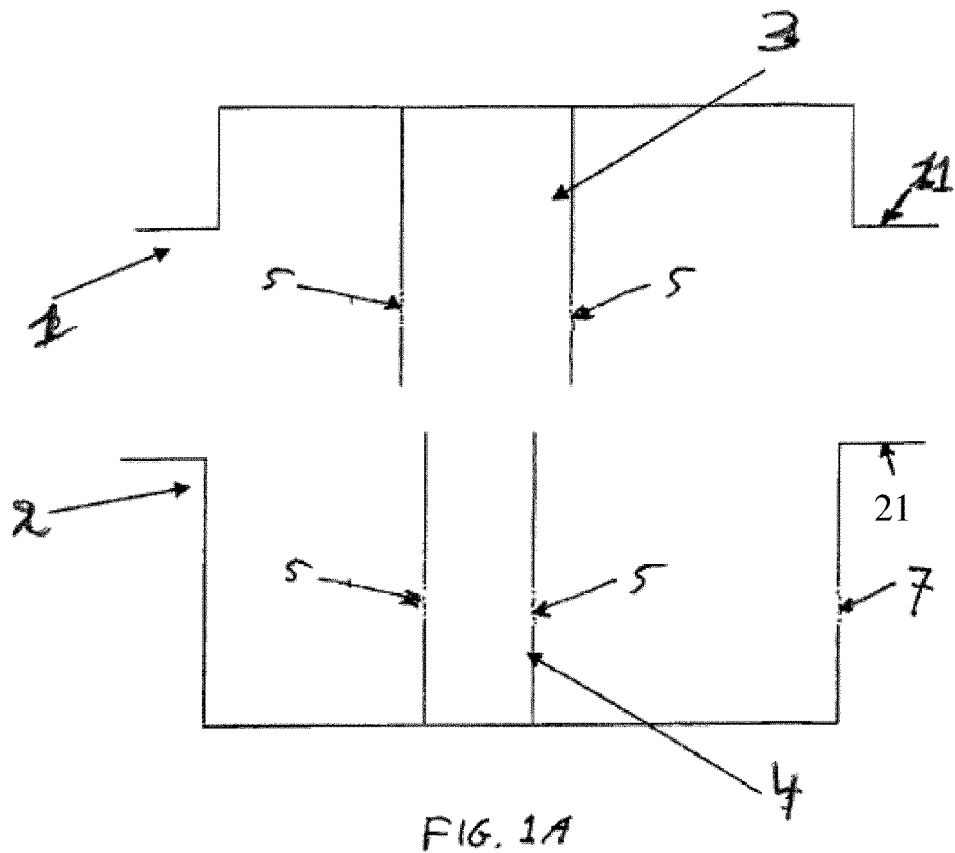
FIG. 1A-1C illustrate a schematic cross sectional view of a first embodiment of a tank of the invention before, during and after assembly, respectively.
Figure 1B:
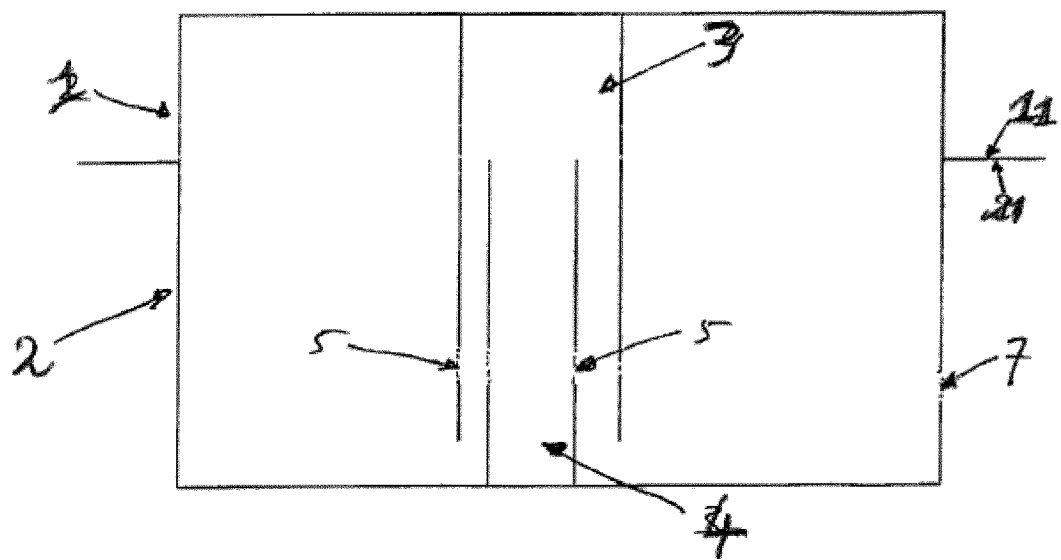
Figure 1C:
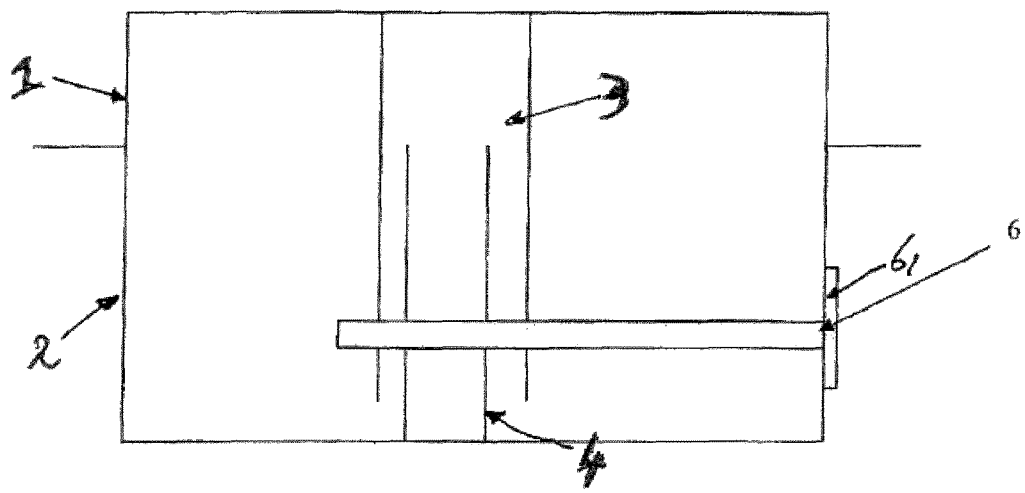

FIGS. 1A-1C illustrate schematically a first embodiment of a tank and method of the invention. The tank is assembled from a plastic top shell 1 having a flange 11 around its edge and a plastic bottom shell 2 having a flange 21 around its edge. Flange 11 mirrors flange 21. In another embodiment the flanges 11 and 21 can have different shape and size. For example, the flange 11 can have a greater surface than the flange 21.

A first elongated connecting member 3 functioning as a reinforcement member extends from and is integrated in a top wall portion of the top shell 1. A second elongated connecting member 4 functioning as a reinforcement member extends from and is integrated in a bottom wall portion of the bottom shell 2. The connecting members 3, 4 are integrally moulded with the respective shells 1, 2.

The connecting members 3, 4 are tube shaped, wherein connecting member 3 has a larger diameter than connecting member 4. The term "tube shaped" should be interpreted as having any hollow cross section, such as circular, rectangular, polygonal, or irregular. Both connecting members 3, 4 are provided with through holes 5. When the top shell 1 is placed on the bottom shell 2 such that their respective flanges 11, 21 are put into contact with each other as shown in FIG. 1B, the outer end of connecting member 3 with its holes 5 extends around the outer end of connecting member 4 with its holes 5, such that said holes are aligned horizontally. The bottom shell 2 is further provided with a hole 7 in its side wall, such that said hole 7 is also horizontally aligned with holes 5. In an alternative embodiment the holes 5, 7 may be aligned in a different direction, for instance hole 7 may be provided in the bottom wall of shell 2, in which case holes 5 are aligned in a slanting direction towards said hole 7.

Before or after the flanges 11, 21 of the shells 1, 2 are welded against each other, a pin 6 is inserted from the outside of the tank through hole 7 in the wall of shell 1 and through holes 5 in the connecting members 3, 4. Thereby relative movement between the connecting members 3, 4 and thereby between the top wall portion and bottom wall portion of the shells 1, 2 is blocked, at least in outward direction (the holes 5 may or may not be shaped such that relative movement in inward direction is possible). The outer end of pin 6 outside of the tank is provided with a flange 61, which is welded against the outside surface of the shell 1 around the hole 7, such that said hole 7 is sealed and the pin 6 is fixed in position.

In a particular embodiment the hole 7 in the side wall of shell 2 can be made after the assembly of the two shells 1, 2, for example by drilling.

It should be noted that the shells 1, 2 may be provided with more than one of pair of connecting members 3, 4, and that these pairs may be arranged such that the pin 6 extends through all holes 5 of said pairs of connecting members 3, 4 at once, in which case all said holes 5 are aligned. Alternatively, separate pins 6 may be used for separate pairs of connecting members 3, 4.

Figure 2:
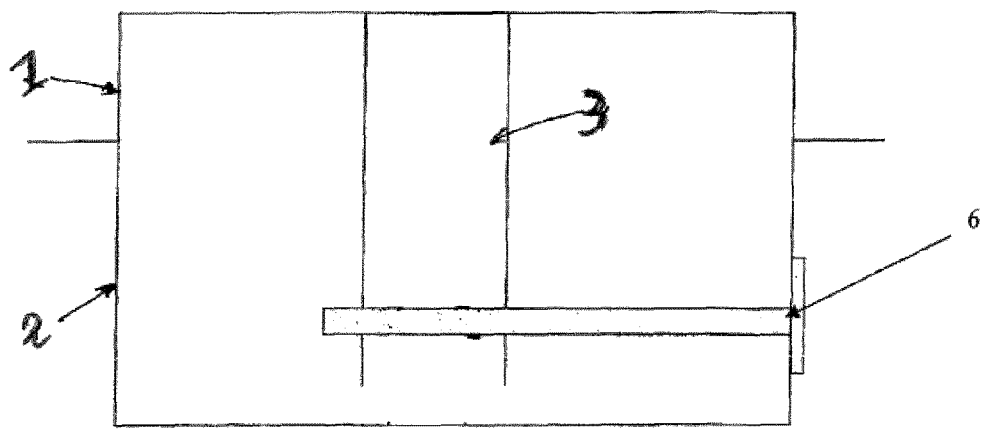
FIG. 2 illustrates a schematic cross sectional view of a second embodiment of a tank of the invention after assembly.

In a second embodiment as shown in FIG. 2, only one of the shells 1, 2, in this example the top shell 1, is provided with one or more connecting members 3 with holes 5 as described above. The pin 6 is inserted through hole 7 and holes 5 and fixed by flange 6 as described above, and is dimensioned such that it functions as a reinforcement member by itself in cooperation with the connecting member 4.

Figure 3:
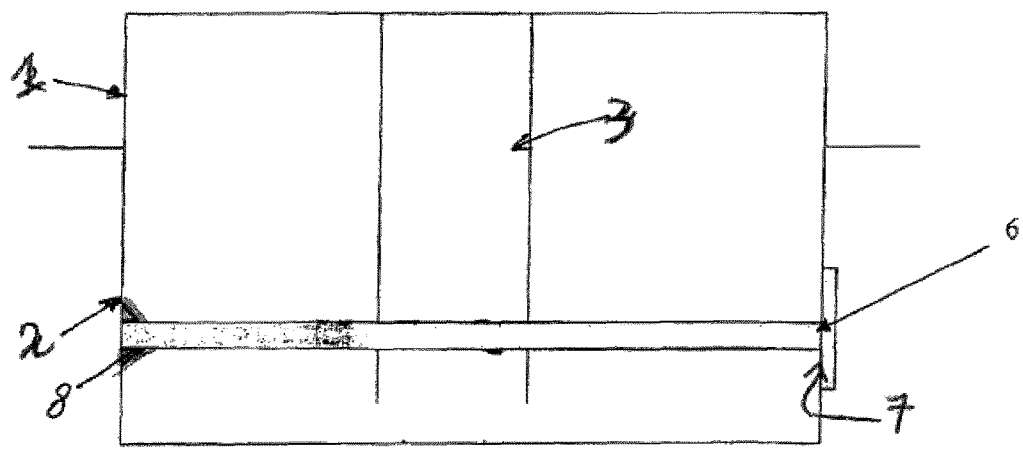
FIG. 3 illustrates a schematic cross sectional view of a third embodiment of a tank of the invention after assembly.

A third embodiment as shown in FIG. 3, is equal to the second embodiment, but the pin 6 is dimensioned such that it reaches to the opposite side wall of shell 2, where a receiving element 8 with a recess is integrated in the wall, such that the outer end of the pin 6 is inserted in said recess of the receiving element 8. Thereby bending of the pin 6 is prevented, such that the connecting member 4 is more securely locked in place. Alternatively the pin 6 may extend through a hole in the opposite side wall of shell 2 where it may be welded, e.g. by pushing a hot tool against the outer end.

Also for the second and third embodiments it should be noted that the shell 1 may be provided with more than one connecting member 3 and that connecting members 3 may be arranged such that the pin 6 extends through all holes 5 of said connecting members 3 at once, to which end all said holes 5 are aligned. Alternatively separate pins 6 may be used for separate connecting members 3.

Figure 4:
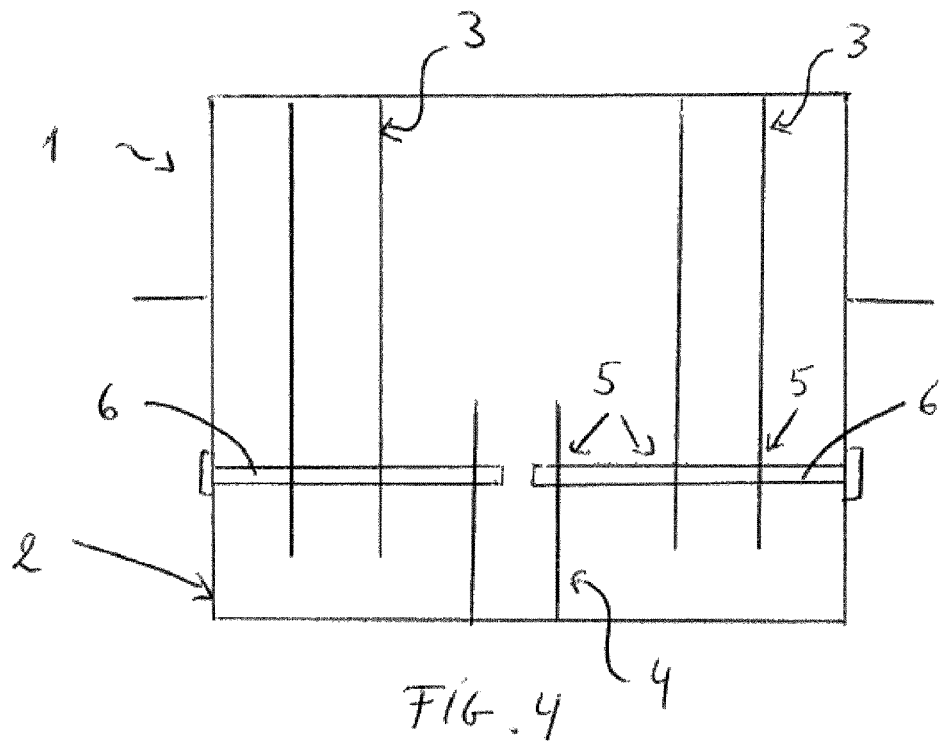
FIG. 4 illustrates a schematic cross sectional view of a fourth embodiment of a tank of the invention after assembly.

A fourth embodiment is illustrated in FIG. 4. The first shell 1 is provided with two first connecting members 3 extending inwardly in the tank. The second shell is provided with a second connecting member 4. A first pin 6 extends through a first opening in a side wall of second shell 2 through a first set of aligned holes 5 in one first connecting member and the second connecting member. A second pin 6 extends through a second opening in a side wall of second shell 2 through a second set of aligned holes 5 in the other first connecting member and the second connecting member.

Figure 5:
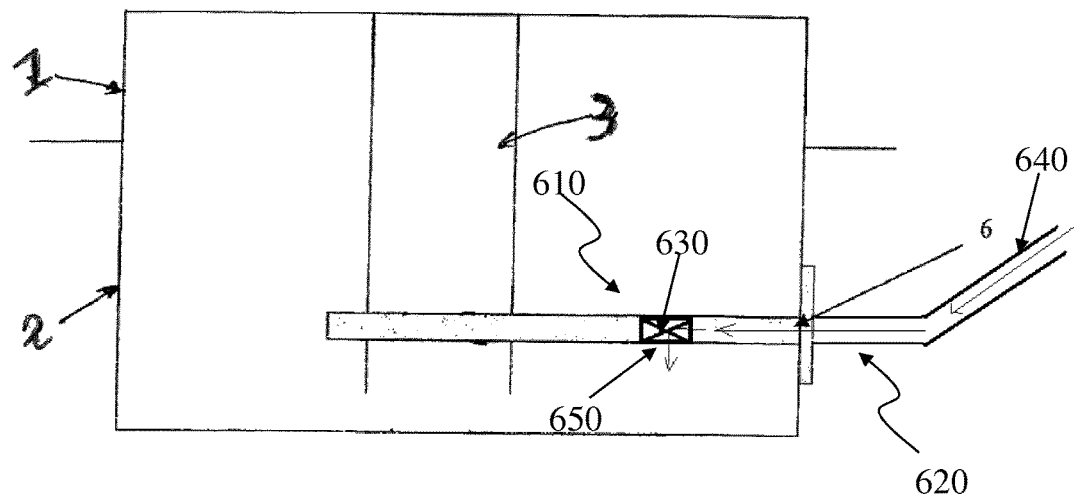
FIG. 5 illustrates a schematic cross sectional view of a fifth embodiment of a tank of the invention after assembly.

The connecting member(s) illustrated in the figures may be shaped to function as a reinforcement member(s) and/or may function as a tank accessory member for receiving therein and/or for supporting a tank accessory. If the connecting member is hollow, and if the interior of the connecting member communicates with the internal volume of the tanks, e.g. a level gauge, a pressure sensor, a valve, etc could be provided in the connecting member. Also the pin may be a hollow tube, and any one of the following elements may be integrated in the pin shaped element: a filler spud, a portion of a venting system. Further, the pin shaped element could function as any one of the following: a fuel line, a venting line, a cable duct. FIG. 5 illustrates schematically a particular embodiment where the pin 6 functions as a part of a refuelling line. In this particular embodiment, the pin 6 is a hollow tube. A first portion 610 of the hollow tube extends inside the tank and a second portion 620 of the hollow tube extends outside the tank. The first portion 610 of the hollow tube comprises an orifice 650. The pin 6 is configured to be in fluid communication with the interior of the tank via the orifice 650. The pin 6 comprises a check-valve 630 arranged inside the pin 6 and around the orifice 650. The second portion 620 of the hollow tube is adapted to be connected to a filler pipe 640. In this particular embodiment, the refuelling of the tank can be made through the pin shaped element.

Figure 6:
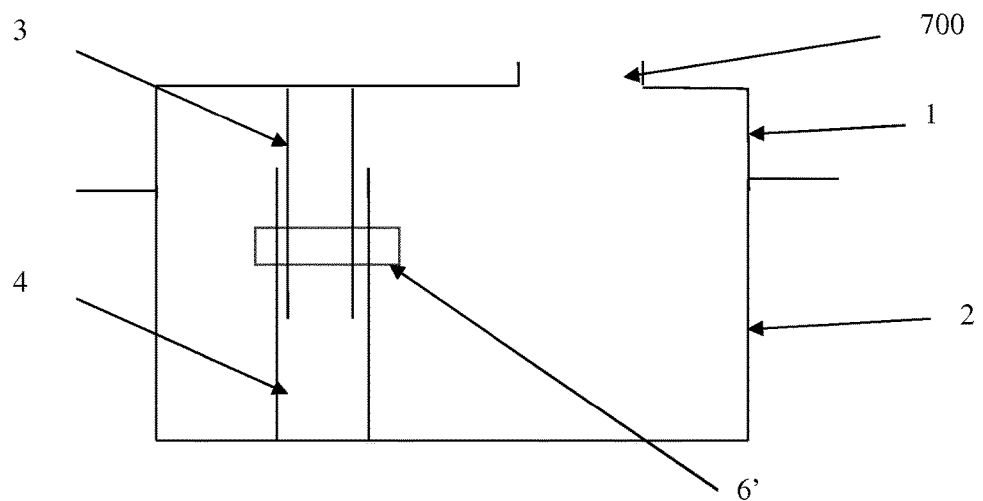
FIG. 6 illustrates a schematic cross sectional view of another embodiment of a tank of the invention after assembly.

Another embodiment as shown in FIG. 6 comprises same elements as those illustrated in FIGS. 1A-1C, except that pin 6 is replaced by pin 6', and hole 7 is replaced by opening 700. In this embodiment, the pin 6' is introduced through the opening 700 made in the wall of the top shell 1. The opening 700 is dimensioned such that it can further be used for introducing pump/gauge module(s) and/or baffles.

Figure 7:
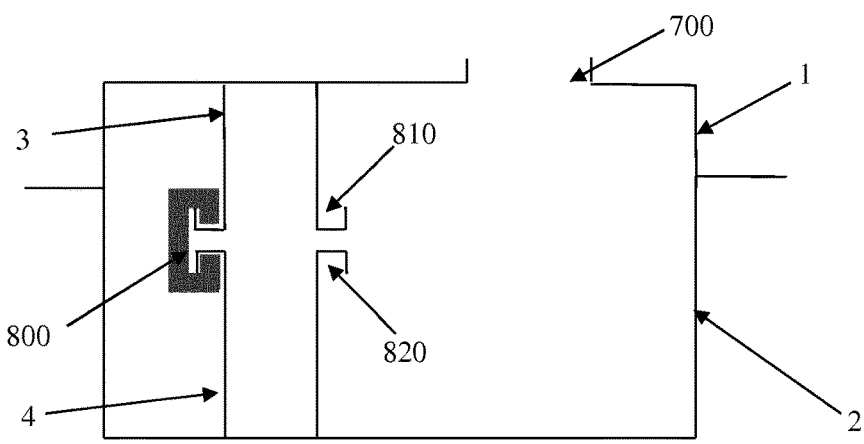
FIG. 7 illustrates a schematic cross sectional view of another embodiment of a tank of the invention after assembly.

A further embodiment is illustrated in FIG. 7. The first shell 1 is provided with a first connecting member 3 extending inwardly in the tank. The first connecting member 3 comprises an external flange defining a circumferential opening 810. The second shell 2 is provided with a second connecting member 4 extending inwardly in the tank. The second connecting member 4 comprises an external flange defining a circumferential opening 820. One or several clips 800 are introduced through the opening 700. Clip 800 has a part configured to be engaged (i.e. inserted) in the circumferential openings 810 and 820. Thereby the first shell and the second shell are connected by the two connecting members, and the clip(s) 800 function(s) as a locking element locking the first connecting member with respect to the second connecting member.

The first shell and/or the second shell of the embodiments illustrated in the figures may be moulded by any one of the following techniques or by a combination of those techniques: injection moulding, compression moulding, injection-compression moulding, thermoforming, blow moulding, extrusion blow moulding, co-injection moulding.

Finally it is noted that embodiments of the invention may be combined with prior art techniques for arranging a connecting member in the tank. For example, there could be arranged a first connecting member in the tank in accordance with embodiments of the invention, and a second connecting member integrally moulded with the first shell having an end part that is welded to a part of the second shell.

Whilst the principles of the invention have been set out above in connection with specific embodiments, it is to be understood that this description is merely made by way of example and not as a limitation of the scope of protection which is determined by the appended claims.

The invention claimed is:
1. A method for assembling a tank comprising:
   providing a first shell and a second shell;
   putting edges of the first and second shells into contact with each other and mutually connecting the edges such that the shells together form a container delimiting an internal volume;
   providing the first shell with a first connecting member extending inwardly from an inner surface of the first shell, the first connecting member including a hole; and
   after the edges of the first and second shells are put into contact with each other, connecting the first connecting member to the second shell by inserting a locking element through a hole in the second shell and the hole in the first connecting member, such that relative mutual movement between the first connecting member and the second shell is prevented.

2. The method of claim 1, wherein the locking element is a pin shaped element.

3. The method of claim 2, further comprising:
   providing the second shell with a second connecting member extending inwardly from an inner surface of the second shell, the second connecting member including a hole; wherein the holes in the first and second connecting members and the hole in the second shell are mutually aligned when the edges of the first and second shell are put into contact with each other; and wherein the pin shaped element is inserted through the aligned holes, such that relative mutual movement between the first and second connecting members and their respective opposite shells is prevented.

4. The method of claim 3, wherein the first and second connecting member comprises a first and second tubular end part each including two oppositely extending holes, respectively, wherein one tubular end part thereof has a larger cross section than the other tubular end part, and a length of the first and second connecting member is such that the other tubular part extends within the one tubular part.

5. The method of claim 2, wherein the first shell includes a plurality of first connecting members, each first connecting member including a hole; wherein the holes of the plurality of first connecting members and the hole in the second shell are mutually aligned when the edges of the first and second shell are put into contact with each other, and wherein the pin shaped element is inserted through the aligned holes of each first connecting member.

6. The method of claim 2, wherein the pin shaped element is inserted transversely through the first connecting member.

7. The method of claim 2, wherein the pin shaped element is locally reinforced at a location where the pin extends through the hole in the first connecting member.

8. The method of claim 2, wherein the pin shaped element includes a laterally extending flange with a surface which is sealed against an outer circumferential surface around the hole in the second shell, such that the hole in the second shell is sealed.

9. The method of claim 2, wherein the first and second shells are made of plastic.

10. The method of claim 2, wherein the pin shaped element is a hollow tube, and any one of the following elements is integrated in the pin shaped element: a filler spud, a portion of a venting system; and/or wherein the pin shaped element also functions as any one of the following: a fuel line, a venting line, a cable duct.

11. The method of claim 2, further comprising:
   providing the second shell with a second connecting member extending inwardly from an inner surface of the second shell, the second connecting member including a hole; wherein the holes in the first and second connecting members are mutually aligned when the edges of the first and second shells are put into contact with each other; and wherein the pin shaped element is inserted through the aligned holes, such that relative mutual movement between the first and second connecting members and their respective opposite shells is prevented.

12. The method of claim 1, wherein the first shell and the first connecting member are molded integrally as a single piece.

13. A tank, or a fuel tank or an additive tank for a vehicle, comprising:
   a first shell and a second shell;
   wherein edges of the first and second shell are mutually connected such that the first and second shell together form a container delimiting an internal volume;
   wherein the first shell includes a first connecting member extending inwardly from an inner surface of the first shell, the first connecting member including a hole; and
   wherein the first connecting member is connected to the second shell by a locking element that extends through a hole in the second shell and the hole in the first connecting member, such that relative mutual movement between the first connecting member and the second shell is prevented.

14. The tank of claim 12, wherein the locking element is a pin shaped element.

15. The tank of claim 14, wherein the second shell includes a second connecting member extending inwardly from an inner surface of the second shell, the second connecting member including a hole; wherein the holes in the first and second connecting members and the hole in the second shell are mutually aligned; and wherein the pin shaped element extends through the aligned holes, such that relative mutual movement between the first and second connecting members and their respective opposite shells is prevented.

16. The tank of claim 14, wherein the first shell includes a plurality of first connecting members, each first connecting member including a hole, wherein the holes of the plurality of first connecting members and the hole in the second shell are mutually aligned, and wherein the pin shaped element extends through the aligned holes of each first connecting member.

17. The tank of claim 14, wherein the pin shaped element includes a laterally extending flange with a surface which is sealed against an outer circumferential surface around the hole in the second shell, such that the hole in the second shell is sealed.

18. The tank of claim 14, wherein the first shell and the first connecting member are molded integrally as a single piece.

19. The tank of claim 14, wherein the pin shaped element is a hollow tube, and any one of the following elements is integrated in the pin shaped element: a filler spud, a portion of a venting system; and/or wherein the pin shaped element is configured to function as any one of the following elements: a fuel line, a venting line, a cable duct.

* * * * *